3,362,990
PROCESS FOR PREPARING PERFLUORO-
METHACRYLYL FLUORIDE
David C. England, Wilmington, Del., assignor to E. I. du
Pont de Nemours and Company, Wilmington, Del., a
corporation of Delaware
No Drawing. Filed May 13, 1964, Ser. No. 367,203
3 Claims. (Cl. 260—544)

This invention relates to an new $\alpha,\beta$-unsaturated carboxylic acid halide and its preparation.

The new product of this invention is perfluoro-methacrylyl fluoride, which has the formula $$CF_2=C(CF_3)-COF$$

Monomeric perfluoromethacrylyl fluoride is prepared by pyrolyzing bis(trifluoromethyl)ketone in the gas phase at a temperature of at least 100° C. under basic and substantially anhydrous conditions. When operating in glass or glass-containing equipment, the glass is generally sufficiently alkaline, unless special care is taken to clean it, to provide the necessary basic environment by itself. Preferably, however, the prolysis is conducted in the presence of at least catalytic amounts of an added solid inorganic base, or salt thereof with a weak acid.

The reaction is a base-catalyzed rearrangement of bis(trifluoromethyl)ketene, and it is represented by the equation $$(CF_3)_2C=C=O \rightarrow CF_2=C(CF_3)-COF$$

The starting material in this process, bis(trifluoromethyl)ketene, may be prepared by heating $\alpha$-hydrohexafluoro isobutyric acid in the presennce of phosphorus pentoxide. A typical preparation is as follows:

An intimate mixture of finely ground $\alpha$-hydrohexafluoroisobutyric acid (196 g., one mole) and phosphorus pentoxide (284 g., two moles) was placed in a 2-liter, one-neck flask connected to a cold water condenser with a solid carbon dioxide trap attached. The flask was heated for about 4 hours at about 200–300° C. The bis(trifluoromethyl)ketene which formed condensed in the cold trap. A total of 110 cc. (about 175 g.; impurity, 2–3% of phosphorus oxyfluoride) was collected. On distillation through a low temperature still, the pure bis(trifluoromethyl)ketene boiled at $+5°$ C.; yield, 168 g. (94% of theory). It was characterized by its infrared absorption (4.54$\mu$, C=C=O); nuclear magnetic reasonance (single peak at $-595$ c.p.s. from difluorotetrachloroethane at 56.4 mc.); molecular weight by gas density (177.8; theory, 178); elemental analysis (calc'd for $C_4F_6O$: F, 64.04; found F, 64.06); and by its reaction with water to form $\alpha$-hydrohexafluoroisobutyric acid, M.P. 50° C.

The rearrangement of bis(trifluoromethyl)ketene to perfluoromethacrylyl fluoride takes place at a temperature which depends in part on the other experimental conditions but should be at least 100° C. The reaction is conducted in the gas phase, i.e., under conditions such that no liquid bis(trifluoromethyl)ketene is present, since it has been found that, when a liquid phase is present, the pyrolysis leads primarily to products other than perfluoromethacrylyl fluoride. When operating in a flow system at or near atmospheric pressure, which is the preferred procedure, all of the bis(trifluoromethyl)ketene is, of course, in the gas phase. Under these conditions, in the absence of added catalysts such as those discussed later, the reaction is to be carried out in non-dealkalized glass equipment, and the temperature should be at least 200° C. in order to obtain appreciable conversions. In the presence of such catalysts, the reaction temperature may be as low as 100° C. However, the pyrolysis reaction can also be conducted in sealed glass-containing vessels under the autogenous pressure of the reactant and reaction product, and in this case the temperature should be high enough (at least 200° C., even in the presence of added catalysts) that no liquid phase is present at the existing internal pressure. Regardless of how the process is carried out, the upper limit of operating temperature is only that imposed by the decomposition point of the starting material and/or reaction product. Thus, it is possible to operate at temperatures as high as 650° C. with short contact times, but there is no advantage in exceeding about 500° C. since the rearrangement reaction reaches an equilibrium which does not shift appreciably beyond that temperature.

The conversions are substantially higher when the reaction is conducted in the presence of an added basic agent, whose effect is to facilitate formation of fluoride ions and attack by the fluoride ion at the carbonyl carbon of bis(trifluoromethyl)ketene. Suitable agents for this purpose are solid, substantially anhydrous Group I metal hydroxides, or their salts with acids at least as weak as hydrofluoric acid. Thus, there can be used sodium hydroxide, potassium hydroxide, sodium fluoride, potassium fluoride, cesium floride, silver cyanide, sodium acetate, potassium benzoate, sodium bisulfite, sodium borate, etc. The alkali metal fluorides are generally the preferred catalysts. The amount of catalysts used, whether in static or in flow systems, is not critical. It may vary from very small quantities, e.g., 0.01 mole per mole of bis(trifluoromethyl)ketone, to very substantial molar excesses, for example when the catalyst is used as the sole contact material in the flow system.

Essentially anhydrous conditions should be maintained throughout, since both the starting material and the reaction product are sensitive to water.

The preferred mode of operation consists in passing gaseous bis(trifluoromethy)ketene, with or without an inert carrier gas such as nitrogen, through a zone heated to 200–500° C. and containing anhydrous sodium fluoride as the contact material and reaction catalyst, and condensing the reaction product and unchanged ketene in a cold receiver.

Perfluoromethacrylyl fluoride is a liquid boiling at 52° C. at 760 mm. pressure. It can be readily separated by fractional distillation from the unchanged bis(trifluoromethyl)ketene.

Unlike other methacrylic acid derivatives, perfluoromethacrylyl fluoride does not itself polymerize under the influence of the usual polymerization initiators such as free radical-generating catalysts, ultarvoilet light or ionizing radiation.

The following examples illustrate the invention in greater detail:

*Example 1*

Nitrogen gas was bubbled through a vessel containing 36 g. of bis(trifluoromethyl)ketene and cooled to about $-25°$ C. The effluent gas was passed through a flowmeter then through a quartz tube about 45 cm. long and 2.5 cm. inside diameter filled with sodium fluoride pellets about 3 mm. in diameter. The tube was electrically heated to 206° C. over a length of about 25 cm., and connected at its outlet side to a trap cooled with Dry Ice/acetone. The gas flow was between 200 and 400 cc./minute.

After all of the bis(trifluoromethyl)ketene had vaporized, the product condensed in the cold trap was transferred to a still pot. The still was connected to a receiver followed by a trap cooled with Dry Ice/acetone. Distillation gave 13.2 g. of liquid boiling at 52° C. at 760 mm. pressure, and 19 g. of recovered bis(trifluoromethyl)ketene in the cold trap. The product boiling at 52° C. was perfluoromethacrylyl fluoride, as shown by elemental and spectral analysis.

*Analysis.*—Calc'd for $C_4F_6O$: C, 26.99; F, 64.04. Found: C, 27.37; F, 64.07.

The infrared spectrum showed absorption bands at 5.40μ (CF=O) and 5.8μ (CF$_2$=C). The fluorine nuclear magnetic resonance spectrum also confirmed the structure. It consisted of three complex multiplets of relative areas 1:3:2, centered, respectively, at −2127, +2813 and +3371 c.p.s. from fluorotrichloromethane at 56.4 mc. The product was further characterized by its conversion, upon treatment with methanol with cooling below 30° C., to the methyl ester of β-methoxy-β,β-difluoro-α-trifluoromethylpropionic acid

B.P. 70° C. at 50 mm. pressure, identified by elemental and spectral analysis.

The rearrangement of bis(trifluoromethyl)ketene to perfluoromethacrylyl fluoride is an equilibrium reaction. This was demonstrated by passing a slow stream of perfluoromethacrylyl fluoride over a bed of sodium fluoride pellets heated to 300° C., essentially as described above, and condensing the effluent gas in a cold trap. This condensate was found by distillation to consist of 40% by weight of unchanged perfluoromethacrylyl fluoride and 60% by weight of bis(trifluoromethyl)ketene, identified by its boiling point and infrared spectrum.

Other experiments in which bis(trifluoromethyl)ketene was pyrolyzed over sodium fluoride by the previously described procedure showed that the amount of conversion to perfluoromethacrylyl fluoride was not appreciably affected by varying the rate at which the ketene was passed through the heated zone, again indicating that an equilibrium is involved in this reaction.

Example 2

Bis(trifluoromethyl)ketene was pyrolyzed over sodium fluoride as described in Example 1, except that the temperature of the reaction zone was 500° C. The distillable product contained about 55% by weight of perfluoromethacrylyl fluoride, the remainder being recovered bis(trifluoromethyl)ketene. Some decomposition occurred, as shown by the presence of a reddish solid material in the cold trap, from which the condensate was decanted prior to distillation.

Example 3

Using the procedure of Example 1, 125 g. of bis(trifluoromethyl)ketene was passed in two hours over sodium fluoride pellets at 102° C. The reaction product consisted of 21.5 g. of perfluoromethacrylyl fluoride and 94 g. of recovered bis(trifluoromethyl)ketene.

Example 4

Example 1 was repeated using an empty reaction tube (no added catalyst) heated to 218° C. From 36 g. of starting material, there was obtained 0.9 g. of perfluoromethacrylyl fluoride, B.P. 52° C., and 33 g. of recovered bis(trifluoromethyl)ketene.

Example 5

Two sealed glass tubes containing, respectively, 5 and 7 g. of bis(trifluoromethyl)ketene without added catalyst were heated at 300° C. for 8 hours. A small amount of black solid formed in each tube. After cooling and opening the tubes, the unreacted ketene was evaporated and the higher boiling products from each tube (1 g. and 2.2 g., respectively) were collected and combined. Redistillation gave 1.1 g. of perfluoromethacrylyl fluoride, identified by its boiling point (50–51° C.) and infrared and n-m-r spectra.

Example 6

Example 1 was repeated, using as the catalyst silver cyanide in coarse granules heated at 205° C. From 39 g. of bis(trifluoromethyl)ketene, there was obtained 7.8 g. of perfluoromethacrylyl fluoride and 27 g. of recovered ketene.

Example 7

Example 1 was repeated, using as the catalyst sodium cyanide in coarse granules heated at 250° C. From 83.5 g. of ketene, there was obtained 20 g. of perfluoromethacrylyl fluoride and 53 g. of recovered ketene.

Owing to its reactive acyl fluoride group, perfluoromethacrylyl fluoride is a valuable intermediate for the preparation of a variety of perfluoromethacrylic acid derivatives such as the amides or esters. It is also a good solvent for highly fluorinated polymers. For example, it dissolves low melting polytetrafluoroethylene (M.P. 83–150° C.) to form a clear solution which can be used to impregnate porous materials and to coat non-porous materials such as metals. Paper impregnated with such a solution, then dried, is rendered water-repellent. Further, it forms copolymers characterized by ability to crosslink and suitable for the preparation of self-supporting films and sheetings, of molded articles, and for the impregnation or coating of porous or semi-porous materials such as paper, textiles, wood, etc., to contribute such properties as strength, toughness and impermeability.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A process for preparing perfluoromethacrylyl fluoride which comprises heating bis(trifluoromethyl)ketene, in the gas phase, in contact with a catalyst selected from the class consisting of a salt of a Group I metal and an acid at least as weak as hydrofluoric acid and Group I metal hydroxides, at a temperature of at least 100° C., under substantially anhydrous conditions.

2. The process of claim 1 wherein the catalyst is an alkali metal fluoride.

3. The process of claim 1 wherein the catalyst is sodium fluoride.

References Cited

UNITED STATES PATENTS

| | | | |
|---|---|---|---|
| 2,440,090 | 4/1948 | Howk et al. | 260—544 X |
| 2,472,812 | 6/1949 | Dickey | 260—544 X |
| 2,554,947 | 5/1951 | Joos | 260—486 |
| 2,891,991 | 6/1959 | Stewart et al. | 260—486 |
| 3,068,212 | 12/1962 | Jenkens | 260—85.5 |
| 3,084,143 | 4/1963 | Hieserman et al. | 260—85.5 |

OTHER REFERENCES

Cheburkov et al.: "Izv. Akad. Nauk, SSSR, Ser. KHim" (1963)(9), pp. 1570–2.

LORRAINE A. WEINBERGER, *Primary Examiner.*

RICHARD K. JACKSON, JOSEPH L. SCHOFER,
*Examiners.*

H. WONG, M. WEBSTER, *Assistant Examiners.*